Sept. 13, 1927.

O. J. LEINS 1,642,373

LIGHTING DEVICE

Filed Aug. 2, 1926

Witnesses:
William P. Kilroy
Harry R. L. White

Inventor:
Oscar J. Leins
Brown, Boettcher
and Dienner
By Attys

Patented Sept. 13, 1927.

1,642,373

UNITED STATES PATENT OFFICE.

OSCAR J. LEINS, OF MILWAUKEE, WISCONSIN, ASSIGNOR TO MILWAUKEE GAS SPECIALTY COMPANY, OF MILWAUKEE, WISCONSIN, A CORPORATION OF WISCONSIN.

LIGHTING DEVICE.

Application filed August 2, 1926. Serial No. 126,541.

This invention relates to lighting devices, and more particularly to lighting devices operated by flashing or projecting a normally restricted pilot flame and its objects are the provision of a simple and improved regulator for the flash flame and the provision of a regulator or adjustment which is adapted for embodiment in the lighter with a minimum of alteration in the structure thereof.

The invention is illustrated in the accompanying drawings in which.

Figure 1:
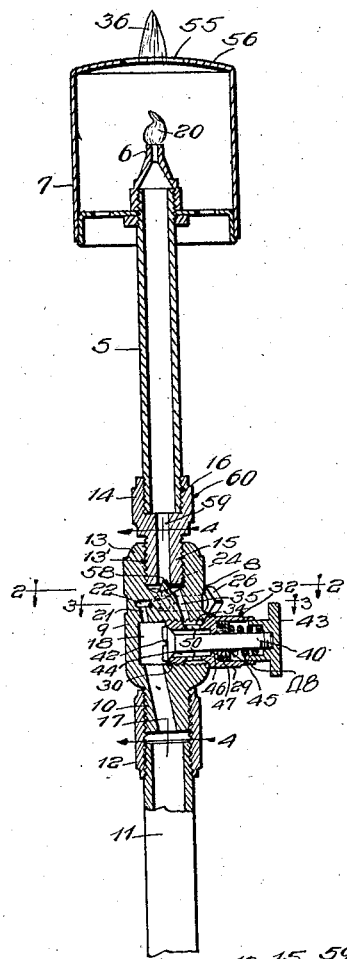
Figure 1 is a longitudinal vertical section through a device embodying the present invention.
Figure 2:
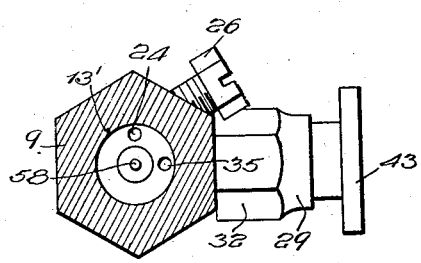
Fig. 2 is a cross section taken on the line 2—2 of Fig. 1.
Figure 3:
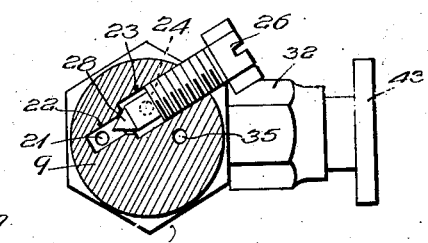
Fig. 3 is a cross section taken on the line 3—3 of Fig. 1.
Figure 4:
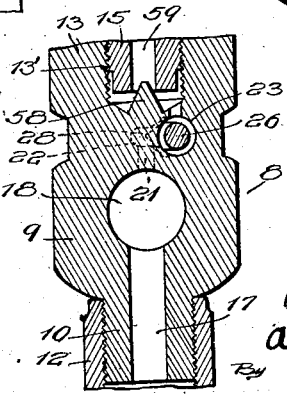
Fig. 4 is an enlarged fragmentary longitudinal section taken on the line 4—4 of Fig. 1.

Referring to the drawings, the lighter shown comprises a lighter tube 5, having a nozzle and hood 6 and 7 at one end and valve means 8 at the other end.

The valve means 8 comprises a valve casing or body 9 having a threaded nipple 10 at one end for connection with the gas or other fuel supply pipe 11, by means of a coupling sleeve 12 threaded upon the nipple 10 and upon the adjacent end of the pipe 11. At its opposite end the valve casing 9 has a boss 13 provided with an internally threaded socket 13' and interposed between the lighter tube 5 and the valve casing 9 is a union nut 14. This union nut 14 has a nipple 15 threaded into the socket 13' of the valve casing and a socket 16 threaded upon the adjacent end of the tube 5.

The valve means with the exception of the regulator or adjustment for the flash or lighting flame is of known construction. An inlet duct 17 opens through the nipple 10 from the pipe 11 and into a well 18 disposed in the valve body. The bottom or inner end of the well 18 opens into a restricted or by-pass outlet for maintaining the normally restricted pilot flame indicated at 20. This by-pass outlet comprises a duct 21 leading from the inner end of the well 18 and opening through a duct 22 and bore 23 into a duct 24 which in turn opens into the end of the lighter tube 5.

For adjusting or regulating the pilot flame 20 a pilot flame adjusting screw 26 is threaded into the bore 23 and has a needle or other suitably formed end 28 which cooperates with the adjacent end of the duct 22, so that by threading the valve screw 26 into or out of the bore 23 the communication between the ducts or passageways 22 and 24 may be regulated to increase or decrease the normal by-pass flow and thereby the size of the pilot flame 20.

A cylindrical valve cage 29 is threaded into the well 18 and has at its inner end a valve seat 30. Peripherally, the cage 28 has a nut-like portion 32 for engagement by a tool for threading the cage into and out of the casing 9 and between its ends the periphery of the cage 28 has a circumscribing recess 34 forming an annular space between the gauge and the interior of the well 18, which opens into or communicates with the outlet duct or passageway 35. The opposite end of the duct 35 opens into the tube 5 through the union nut 14 and supplies fuel for the flash or projected lighting flame.

Slidably mounted in the cage 28 is a stem or plunger 40, which has its lower or inner end enlarged to form a valve head 42 and which has threaded upon its outer end a button 43. The valve cage 28 has an inner bore 44 and an outer bore 45 between which is an annular packing seat 46. Seated upon the seat 46 is suitable packing means 47 and a spring 48 surrounding the stem 40 and interposed between the packing 47, and the button 43 holds the packing properly seated and normally urges the valve head 42 outwardly into closed engagement with the valve seat 30. The cage 28 has in its wall, openings 50 opening into the recess 34 and placing the cage bore 44 into communication with the duct 35 and thereby into communication with the lighter tube 5.

From the foregoing it will now be apparent that in operation, the relatively small pilot flame 20 normally issues from the nozzle 6 and that by pressing the button 43 the pilot 20 is flashed or projected at 36 out through the opening 55 in the upper end 56 of the hood 7.

Now, for the purpose of adjusting or regulating the flash or projected lighting flame 36, I provide the valve casing or body 9 at the inner end of the socket 13' with a needle-like tapered projection 58. This projection 58 is disposed axially with respect to the duct 59 in the union nut 14 and by its cooperation with the inner end of the duct 59 regulates the flash supply to the nozzle 6. The union nut 14 has a peripheral portion formed nut-like at 60 which is adapted to be engaged by a suitable tool for threading the nut 14 into and out of the socket 13'. By threading the nut 14 into the socket 13', the inner end of the duct 59 moves over the needle-like projection 58 and gradually decreases the communication between the duct 35 and the tube 5. By threading the nut 14 out from the socket 13' the inner end of the duct 59 is moved out from the needle-like projection 58 and gradually increases the supply from the duct 35 to the tube 5.

To regulate the flash or lighting flame 36 the button 43 is depressed or pushed in and the nut 14 is then turned until the flame 36 reaches the desired height. In use, the pilot and flash flame lengths are preferably set and then left alone and it is to be understood that the entire gas supply to the tube 5 could be shut off by threading the inner end of the nut 14 down into engagement with the projection 58 should it ever be desirable to do so.

The present invention has particular utility in a cigar or cigarette lighter although it is not limited to any particular purpose but may be employed wherever desired.

The present provisions provide for adjusting the lighter to local gas conditions or for whatever other purpose desired and the adjustment is simple and convenient. The structure is also simple and is adapted for embodiment in existing types of devices with a minimum of alteration therein.

I claim:

1. In a lighter, the combination of a valve casing, a lighter tube connected therewith, a lighter head on said tube, means controlled by relative adjustment between the tube and casing for regulating the fuel supply to the lighter head, said casing having means permitting a restricted supply of fuel to said tube and a plunger valve mounted in said casing and operable to increase the fuel supply to the tube.

2. In a lighter, the combination of a valve casing, a lighter tube, a lighter head on said tube, a connection between said casing and tube, means controlled by adjustment of said connection for regulating the fuel supply to the lighter head, said casing having means permitting a restricted supply of fuel to said tube and a plunger valve mounted in said casing and operable to increase the fuel supply to the tube.

3. In a lighter, the combination of a valve casing, a lighter tube, a lighter head on said tube, a coupling nut between said casing and tube, cooperating metering means between the casing and said nut for regulating the fuel supply to the lighter head, said casing having means permitting a restricted supply of fuel to said tube and a plunger valve mounted in said casing and operable to increase the fuel supply to the tube.

4. In a lighter, the combination of a valve casing, a tubular member having threaded engagement therewith, a lighter head, metering means in said casing and cooperable with the end of said tube for regulating the fuel supply to the lighter head, said casing having means permitting a restricted supply of fuel to said tube and a plunger valve mounted in said casing and operable to increase the fuel supply to the tube.

5. In a lighter, the combination of a valve casing, a tubular member having threaded engagement therewith, a lighter head, metering means in said casing and cooperable with the end of said tube for regulating the fuel supply to the lighter head, said metering means being adjusted by adjustment of said tubular member relative the casing, said casing having means permitting a restricted supply of fuel to said tube and a plunger valve mounted in said casing and operable to increase the fuel supply to the tube.

6. In a lighter, the combination of a valve casing having means for connection with a source of fuel supply, a valve cage mounted in said casing, a lighter tube, said casing having means permitting a restricted supply of fuel to said tube, a plunger valve mounted in said casing and operable to increase the fuel supply and a tapered needle-like projection in the casing and cooperable with the end of the tube for regulating the increased fuel supply.

7. In a lighter, the combination of a valve casing having a recess therein, a tubular lighter member threaded into said recess, a tapered needle-like projection in the casing at the inner end of the recess and cooperable with the end of the tubular lighter member for regulating its communication between the casing and said member, said casing having means permitting a restricted supply of fuel to said tube and a plunger valve mounted in said casing and operable to increase the fuel supply to the tube.

In witness whereof, I hereunto subscribe my name this 27th day of July, 1926.

OSCAR J. LEINS.